May 9, 1967  M. L. HENDERSON  3,318,102
VAPOR-LIQUID MIXING TO CONTROL REFRIGERATING TEMPERATURE
IN LIQUEFACTION OF GASEOUS MATERIAL
Filed Aug. 24, 1964
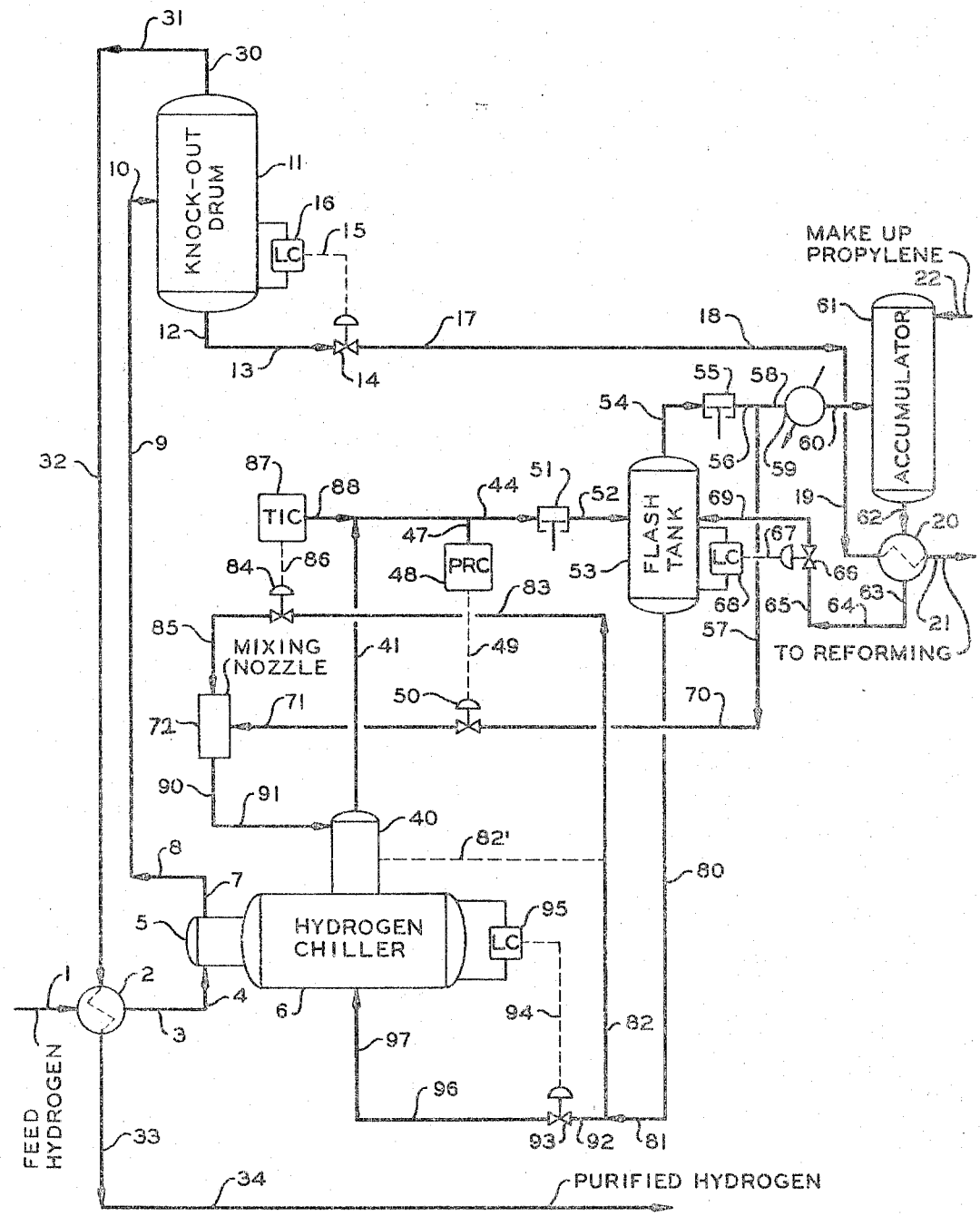
INVENTOR.
M.L. HENDERSON
BY Young & Quigg
ATTORNEYS 3,318,102
VAPOR-LIQUID MIXING TO CONTROL REFRIGERATING TEMPERATURE IN LIQUEFACTION OF GASEOUS MATERIAL
Miles L. Henderson, Bartlesville, Okla., assignor to Phillips Petroleum Company, a corporation of Delaware
Filed Aug. 24, 1964, Ser. No. 391,437
4 Claims. (Cl. 62—9)

This invention relates to a method and apparatus for cooling materials.

Heretofore when operating a system which is engineered to cool a continuous stream of feed material by utilizing a constant temperature evaporative chilling zone in which indirect heat exchange is achieved between the feed material and a separate and distince coolant, the system has operated inefficiently since the feed material inevitably varies as to temperature and/or quantity. Due to the temperature and/or quantity variance of the feed material the system has constantly varied from the desired constant temperature. This temperature fluctuation of the system causes inefficiency in operation. For example, at no or low load conditions, e.g. a small quantity of feed to be cooled, there is relatively little coolant vapor present in the chiller due to the lack of feed material passing therethrough. When this occurs the compressor which removes coolant vapor from the chiller and compresses same for cooling and reuse tends to create a reduced pressure in the chiller since the compressor has an insufficient amount of coolant vapor to operate on. Thus, due to the reduced pressure in the chiller, coolant will vaporize even though no heat is added by the feed and thereby lower the temperature in the chiller below that which is desired and even that which the chiller is designed to withstand. Thus, it is highly desirable but not heretofore attainable to maintain the cooling operation at a constant temperature and pressure despite a varying cooling demand on the system.

Accordingly, it is an object of this invention to provide a method and apparatus for maintaining constant cooling conditions notwithstanding varying cooling demands. It is another object of this invention to provide a cooling method and apparatus which will, by operations internal of the cooling system, maintain said system at constant cooling conditions at no or small load cooling requirements.

Other aspects, objects and the several advantages of the invention are apparent from a study of this disclosure, the drawing and the appended claims.

According to this invention at no or low load cooling requirements, hot, compressed coolant is mixed with cold, liquid coolant to form a composite material which is at a temperature low enough to maintain the chiller at the desired constant temperature but which also has an amount of coolant vapors associated therewith sufficient to maintain the desired constant pressure in the chiller. The constant pressure in the chiller helps maintain the desired constant temperature and also supplies sufficient coolant vapors to the compressor to prevent same from creating a reduced pressure in the chiller. The temperature and pressure of the composite material can vary over a wide range depending upon the type of coolant utilized but will generally vary from −30° F. to −60° F., preferably from −45° F. to −55° F., and from 22 p.s.i.a. to 10 p.s.i.a., preferably from 18 p.s.i.a. to 13 p.s.i.a. The above temperature and pressure ranges also define the ranges of constant temperatures and pressures for the chiller. The hot coolant will be from 100° F. to 200° F., preferably from 150° F. to 170° F. and from 250 p.s.i.a. to 300 p.s.i.a., preferably from 265 p.s.i.a. to 275 p.s.i.a. The cool coolant will be from −35° F. to −60° F., preferably from −45° F. to −55° F. and from 22 p.s.i.a. to 10 p.s.i.a. and preferably from 18 p.s.i.a. to 13 p.s.i.a. The ratio of hot coolant to cool coolant will be in the weight ratio of from 2/1 to 4/1.

It should be noted that cool coolant per se or hot coolant per se are not sufficient to satisfy the no or low load requirements that are met by this invention. Hot coolant per se provides the desired vapors and pressure but not the desired temperature, while cool coolant provides the temperature but not sufficient vapors and pressure. However, when hot and cool coolant are mixed the cool coolant reduces the over-all temperature to that desired to maintain the chiller at a constant temperature and, surprisingly, the hot coolant provides vapor itself and provides heat to produce vapor from the cool coolant, the total vapors produced equalling that desired to maintain the chiller at a constant pressure.

The drawing shows diagrammatically a system embodying this invention.

More specifically, there is shown in the drawing incoming, impure feed material containing at least 80 mol percent hydrogen and from 10–20 mol percent of hydrocarbons having from 1 to 7 carbon atoms per molecule (i.e. methane, ethane, propane, butane, isobutane, n-pentane and the like) in line 1 being subjected in 2 to indirect heat exchange conditions with cooled and purified feed material from line 32. The thus cooled feed material then passes by 3 and 4 to heat exchanger and chiller 5 and 6 to be further indirectly cooled. The thus treated feed material then passes by 7, 8, 9 and 10 to separator 11, which can be a knock-out drum with mist extractor, as is known in the art. In separator 11, impurities collect in the bottom thereof and pass by means of 12, 13, 17, 18, 19 and 21 to subsequent treatment, as desired. The flow of impurities from separator 11 is controlled by valve 14, which valve, in turn, is controlled through 15 by liquid level controller 16. The thus purified feed material containing at least 94 mol percent hydrogen and from 1–6 mol percent hydrocarbons having from 1 to 7 carbon atoms per molecule is removed from separator 11 by 30, 31 and 32, to be subjected to an indirect heat exchange relationship with incoming, impure feed material from line 1, and to then pass by 33 and 34 out of the system for further treatment as desired, for example to be used in a hydrogenation operation.

Chiller 6 has mounted thereon scrubber 40 so that coolant vapor generated by the indirect heat exchange operation in 6 with feed material in coil 5 passes through scrubber 40 into line 41, and then through 44 to compressor 51, wherein the vapors are compressed. The heated vapor from compressor 51 then passes by 52 to flash tank 53 wherein the vapor is directly cooled by cold liquid coolant introduced into flash tank 53 via 69, which is described hereinafter. Liquid coolant collects in the bottom of flash tank 53 and passes therefrom, through 80 and 81, to either or both of two separate routes to chiller 6. Part or all of the liquid coolant may flow through 92, 93, 96 and 97 directly into chiller 6. Also, part or all of the liquid coolant can pass through 82, 83, 84 and 85 to mixing nozzle 72. In mixing nozzle 72, the liquid coolant from line 85 can be mixed with warmer vaporous coolant from line 71, or can pass, without the addition of any warmer vaporous coolant, into scrubber 40 by way of 90 and 91. The amount of liquid coolant passing through line 85 is controlled by valve 84, which in turn is controlled through 86 by temperature controller 87, which in turn is operatively connected (e.g. by thermocouple) by 88 to coolant issuing from scrubber 40 through 41. The amount of relatively warm vaporous coolant passing to mixing nozzle 72 through 71 is controlled by valve 50, which in turn is controlled through 49 by pressure recorder controller 48, which is in turn operatively connected by way of 47 to line 44. Thus, it can be seen that pressure recorder controller 48 regulates valve 50 in response to pressure fluctuations in chiller 6 and scrubber 40, as communicated thereto by way of lines 41 and 47.

Thus, it can be seen that coolant is fed to chiller 6, through line 97, to chill the feed material passing through heat exchanger 5 by evaporation of the coolant. The coolant vapors from the chiller flow through scrubber 40, into line 41, and on, for compression, cooling, condensing, etc. At a no or small cooling load on chiller 6, pressure controller 48 can be set to open normally closed valve 50 and thereby, in effect, recycle hot coolant from compressor 55 through mixing nozzle 72 and into scrubber 40. This maintains proper pressure on the chiller 6 and eliminates the possibility of compressor 51 reducing the pressure in chiller 6 and thereby undesirably reducing the temperature of the chiller as described above.

Also, at the no or small cooling load condition, since a substantial portion of the hot coolant from compressor 55 is by-passed around condenser 59 and returned to scrubber 40, in order to remove at least some of the heat of compression from said hot coolant so that near normal temperatures exist as the fluid from 91 passes into scrubber 40, cool coolant from line 85 is mixed, in mixing nozzle 72, with said hot coolant prior to introduction of all of said materials into scrubber 40. The amount of cool coolant passed from line 85 into mixing nozzle 72 is dependent upon the temperature of the effluent of scrubber 40, as sensed by temperature controller 87. Thus, as the temperature of the effluent increases beyond a predetermined maximum temperature for the scrubber, normally closed valve 84 opens to allow more cold liquid coolant to flow through line 85 into mixing nozzle 72. It should be noted that it is within the scope of this invention to pass into mixing nozzle 72, and, therefore, scrubber 40, material solely from line 85 and material solely from line 71, as well as the above-disclosed preferred mixing of materials from both lines substantially contemporaneously. Since coolant vapors are not as necessary to the operation when the chiller is overheated, in order to reduce the temperature in the chiller all that is necessary is to pass cool coolant per se to scrubber 40 from line 85.

The hot coolant from compressor 55 can pass, in toto or in part, through 58 to indirect heat exchanger 59, and then through 60, to accumulator 61. Makeup liquid coolant is supplied to accumulator 61 by 22. Accumulated liquid coolant passes from accumulator 61 by 62 into an indirect heat exchange relationship, in heat exchanger 20, with the cold liquid bottom flow of impurities from separator 11. From heat exchanger 20 the cooled liquid coolant is returned to flash tank 53 by way of 63, 64, 65 and 69. The amount of coolant returning to flash tank 53 by way of 69 is controlled by valve 66, which in turn is controlled through 67 by liquid level controller 68 on flash tank 53.

It should be noted that various combinations of valves, pressure recorder controllers, temperature recorder controllers, etc., can be made in order to achieve the results of this invention. For example, line 82 can be made to attach directly to scrubber 40 in a manner indicated on the drawing by reference numeral 82'. When this is done, instead of having valves 50 and 84 and controllers 48 and 87 as shown in the drawing, the following can be substituted:

(1) A valve can be inserted in line 44, which valve is controlled by a pressure recorder controller, which pressure recorder controller is responsive to the pressure in line 44; and (2) A valve can be inserted in line 70, which valve is controlled by a pressure controller, which pressure controller is responsive to pressures in line 44, downstream of the valve referred to in (1) above; and, finally, (3) A valve can be inserted in line 82', which valve is controlled by a temperature controller, which temperature controller is responsive to temperatures in line 44.

By this arrangement of valves, etc., at the no or low load situation a decrease in pressure will be obtained in scrubber 40 and, therefore, in line 44, which decrease will be sensed by both the pressure recorder controller and pressure controller operatively connected to line 44. In response to the sensing of this decreased pressure, the pressure recorder controller will first effect a pinching down of the valve in line 44 in an attempt to maintain the desired pressure in the chiller (to allow for greater fluid flow), and the pressure controller will open the valve in line 70 to allow more effluent from compressor 55 to pass from said valve into lines 71, 90 and 91 and, therefore, into scrubber 40. This operation, increased flow and pressure, will then effect a further opening of the valve in 44. Finally, the increase in temperature of vapors passing from scrubber 40 into line 44, due to the increasing amount of compressor effluent, which is relatively warm, into scrubber 40, will be sensed by the temperature controller operatively attached to line 44, which temperature controller will in turn open the valve in line 82', thereby allowing additional, cool liquid coolant to pass directly into scrubber 40, and thereby removing the heat of compression from the effluent vapors from compressor 55 that is also passing into scrubber 40 and thereby maintaining near normal operating temperatures at the compressor.

*Example*

Approximately 1300 mols per hour of hydrogen of 32 weight percent purity pass through heat exchanger 2 at a temperature of 104° F. and leave said heat exchanger at a temperature of 7° F. The hydrogen then passes in heat exchange relationship with hydrogen chiller 6 and leaves therefrom at a temperature of −40° F. and passes to a separation zone 11, which is maintained at −40° F. and 525 p.s.i.a. In the separation zone a substantial portion of the hydrocarbon impurities separate from the hydrogen, and essentially all of the hydrogen leaves the separator at a temperature of −40° F. of a 48 weight percent purity. This purified hydrogen is then passed in heat exchange relationship with incoming impure hydrogen in heat exchanger 2, and the purified hydrogen leaves said heat exchanger at a temperature of 87° F., to be passed on for further operations such as hydrogenation. The hydrogen chiller 6 is maintained at a temperature of −50° F. and a pressure of 16 p.s.i.a. Propylene vapors created by the heat exchange carried on in association with the hydrogen chiller issue at the rate of 341 cubic feet per minute and −50° F. from scrubber 40 and pass via 41 and 44 to a low-stage compressor 51.

The effluent from said compressor is at a temperature of 74° F. and a pressure of 65 p.s.i.a. and, in this condition, passes via 52 to flash tank 53, which is maintained at a pressure of 65 p.s.i.a. The overhead flow 54 of propylene from flash tank 53 is at a temperature of 46° F. and a pressure of 65 p.s.i.a. and passes at the rate of 535 cubic feet per minute via 54 to a high stage compressor 55. The effluent from the high stage compressor is at a temperature of 160° F. and a pressure of 270 p.s.i.a. It is this relatively warm, 160° F., propylene vapor which is either recycled to mixing nozzle 72 or passed on to condenser 59, or both. That part, if it not be all, of the relatively warm propylene vapor that passes via 58 to condenser 59 exits via 60 from said condenser at a temperature of 100° F. and a pressure of 260 p.s.i.a. and, in this liquid condition, passes to propylene accumulator 61, which is maintained at a temperature of 100° F. and a pressure of 260 p.s.i.a. Additional makeup propylene liquid of approximately 99 percent by weight purity is added, as needed, via 22 to said accumulator. The propylene liquid flowing out from said accumulator via 62 is at a temperature of 100° F. and passes, in heat exchange relationship in heat exchanger 20, with the bottom flow of materials separated from the hydrogen in separation zone 11, which bottom flow is at a temperature of −40° F. Said bottom flow material leaves heat exchanger 20 at a temperature of 85° F., and the propylene liquid from said accumulator leaves heat exchanger 20 via 63 at a temperature of 60° F. and a pressure of 260 p.s.i.a. The propylene liquid leaving heat exchanger 20 as aforesaid is returned to flash tank 53 to effect cooling of the vapors introduced thereinto via 52. The bottom flow of propylene from flash tank 53 is at a temperature of 18° F. and 65 p.s.i.a., and it is this liquid propylene that is either passed directly to hydrogen chiller 6 by way of lines 96 and 97, or indirectly to scrubber 40 by way of line 85 and mixing nozzle 72, or both. Sufficient liquid propylene is passed to hydrogen chiller 6 and to flash tank 53 to maintain the desired liquid levels therein.

The degree of purification achieved by this operation is shown by the following table:

| Component | Feed (1) | | Product (30) | |
| --- | --- | --- | --- | --- |
| | Weight percent | Mols/ Hr. | Weight percent | Mols/ Hr. |
| Hydrogen | 32 | 1,195 | 48 | 1,195 |
| C₁ and C₂ Hydrocarbons | 10 | 31 | 14 | 29 |
| C₃ Hydrocarbons | 18 | 31 | 21 | 24 |
| C₄ Hydrocarbons | 18 | 24 | 14 | 13 |
| C₅ and Heavier Hydrocarbons | 22 | 19 | 3 | 1 |
| Totals | 100 | 1,300 | 100 | 1,262 |

Any known coolant is applicable to this invention; however, in the purification of hydrogen, propylene is the preferred but not exclusive coolant.

Also, this invention is applicable to the purification of any feed material which can be purified by refrigeration methods.

Reasonable variations and modifications of this invention can be made, or followed, in view of the foregoing, without departing from the spirit or scope thereof.

I claim:
1. A method for maintaining a cooling zone for an impure hydrogen stream containing at least 80 mol percent hydrogen and from 10 to 20 mol percent of hydrocarbons having from 1 to 7 carbon atoms per molecule at a constant temperature and pressure notwithstanding no or low load cooling conditions which cause decreased pressures and therefore temperatures in said zone which comprises in response to said decreased pressures providing a stream of hot propylene which is at a temperature in the range of from 150° F. to 170° F. and a pressure in the range of from 265 p.s.i.a. to 275 p.s.i.a., providing a stream of cool propylene which is at a temperature in the range of from −45° F. to −55° F. and a pressure in the range of from 18 p.s.i.a. to 13 p.s.i.a., mixing said hot propylene and cool propylene respectively in a weight ratio of from 2/1 to 4/1 to thereby form a mixture which is at a temperature in the range of from −45° F. to −55° F. and a pressure in the range of from 18 p.s.i.a. to 13 p.s.i.a. and adding the mixture to said zone in amounts sufficient to raise pressure in said zone to the desired constant pressure, and passing impure hydrogen in heat exchange with said cooling zone.

2. In a cooling system, a heat exchanger having a scrubbing section communicating with the upper portion of the shell thereof, a refrigerant circulation system including a compressor and a flash tank, conduit means connected to pass vapor from the upper portion of said scrubbing section to said flash tank, conduit means connecting the upper part of said flash tank in series with said compressor, a conduit connecting the bottom portion of said flash tank to the bottom portion of the shell of said heat exchanger, a temperature controller responsive to the temperature of said scrubbing section, a control valve operatively connected to said temperature controller, conduit means connected to transfer liquid from said flash tank through said valve to said scrubbing section to admit liquid thereto when the temperature in said scrubbing section exceeds a predetermined value, a pressure controller responsive to the pressure of said scrubbing section, a control valve operatively connected to said pressure controller, and conduit means to transfer fluid from the outlet of said compressor through the last-mentioned control valve to said scrubbing section when said pressure falls below a predetermined value.

3. In a cooling system, a heat exchanger having a scrubbing section communicating with the shell thereof, a refrigerant circulation system including a compressor and a flash tank, conduit means connected to pass vapor from said scrubbing section to said flash tank, conduit means connecting said flash tank in series with said compressor and an upper portion of said flash tank, a conduit connecting the bottom portion of said flash tank to the shell of said heat exchanger, a temperature controller responsive to the temperature of said scrubbing section, a control valve operatively connected to said temperature controller, a mixing nozzle, conduit means connected to transfer liquid from said flash tank through said valve and said mixing nozzle to said scrubbing section to admit liquid thereto when the temperature in said scrubbing section exceeds a predetermined value, a pressure controller responsive to the pressure of said scrubbing section, a control valve operatively connected to said pressure controller, and conduit means to transfer fluid from the outlet of said compressor through the last-mentioned control valve and said mixing nozzle to said scrubbing section when said pressure falls below a predetermined value.

4. In a cooling system, a tube-type heat exchanger having a scrubbing section communicating with the upper portion of the shell thereof, means for circulating a fluid to be cooled through the tube portion of said exchanger, a refrigerant circulation system including a compressor, a heat exchanger, an expansion valve and a flash tank, conduit means connected to pass vapor from the upper portion of said scrubbing section to said flash tank, conduit means connecting the upper part of said flash tank in series with said compressor, said last-mentioned heat exchanger, said expansion valve, and an intermediate portion of said flash tank, a conduit connecting the bottom portion of said flash tank to the bottom portion of the shell of said heat exchanger, a liquid level controller connected to the shell, said controller regulating the flow of liquid through the last-mentioned conduit so as to maintain a predetermined liquid level in said shell, a temperature controller responsive to the temperature at the upper part of said scrubbing section, a control valve operatively connected to said temperature controller, a mixing nozzle, conduit means connected to transfer liquid from said flash tank through said valve and said mixing nozzle to an upper region of said scrubbing section to admit liquid thereto and scrub the gases therein when the temperature in the upper region of said scrubbing section exceeds a predetermined value, a pressure controller responsive to the pressure at the upper part of said scrubbing section, a control valve operatively connected to said pressure controller, and conduit means to transfer fluid from the outlet of said compressor through the last-mentioned control valve and said mixing nozzle to an upper region of said scrubbing section when said pressure falls below a predetermined value.

References Cited by the Examiner

UNITED STATES PATENTS

| | | | |
|---|---|---|---|
| 2,265,527 | 12/1941 | Hill | 62—40 X |
| 2,344,215 | 3/1944 | Soling et al. | 62—196 |
| 3,020,723 | 2/1962 | De Lury et al. | 62—40 X |
| 3,266,260 | 8/1966 | Kelley | 62—21 |

NORMAN YUDKOFF, *Primary Examiner.*

V. W. PRETKA, *Assistant Examiner.*